United States Patent
Nickel et al.

(10) Patent No.: US 8,508,643 B2
(45) Date of Patent: Aug. 13, 2013

(54) METHOD AND SYSTEM FOR PROCESSING AN IMAGE

(75) Inventors: Janice H. Nickel, Sunnyvale, CA (US); Peter Hartwell, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2729 days.

(21) Appl. No.: 10/346,462

(22) Filed: Jan. 17, 2003

(65) Prior Publication Data

US 2004/0141085 A1    Jul. 22, 2004

(51) Int. Cl.
*H04N 5/222*    (2006.01)

(52) U.S. Cl.
USPC .................................................. 348/333.01

(58) Field of Classification Search
USPC ............... 348/208.2, 208.12, 208.16, 333.01, 348/333.02, 333.06, 333.11, 333.12
See application file for complete search history.

(56) References Cited

U.S. PATENT DOCUMENTS

| | | | | |
|---|---|---|---|---|
| 5,138,460 | A | * | 8/1992 | Egawa ........................... 348/239 |
| 5,861,916 | A | * | 1/1999 | Sekine et al. ............. 348/207.99 |
| 6,069,648 | A | * | 5/2000 | Suso et al. .................. 348/14.02 |
| 6,105,427 | A | | 8/2000 | Stewart et al. |
| 6,201,554 | B1 | * | 3/2001 | Lands ............................ 345/169 |
| 6,262,769 | B1 | * | 7/2001 | Anderson et al. ........... 348/333.1 |
| 6,288,704 | B1 | * | 9/2001 | Flack et al. .................... 345/158 |
| 6,414,716 | B1 | | 7/2002 | Kawai |
| 6,567,068 | B2 | * | 5/2003 | Rekimoto ....................... 345/156 |
| 6,597,817 | B1 | * | 7/2003 | Silverbrook .................. 382/289 |
| 6,776,042 | B2 | | 8/2004 | Pike et al. |
| 2002/0109782 | A1 | * | 8/2002 | Ejima et al. .............. 348/333.01 |

\* cited by examiner

*Primary Examiner* — James Hannett

(57) ABSTRACT

The present invention includes a method and system for processing images captured with an image-capturing device. According to the present invention, a method and system includes reconfiguring a display of an image based on the orientation of the image-capturing device when the image is captured. Through the use of the method and system in accordance with the present invention, a user can view captured images without having to account for a rotation of the image-capturing device. The method and system includes capturing the image with an image-capturing device, determining an orientation of the image-capturing device and reconfiguring a display of the image based on the orientation of the image-capturing device.

17 Claims, 8 Drawing Sheets

METHOD AND SYSTEM FOR PROCESSING AN IMAGE

FIELD OF THE INVENTION

The present invention relates to the field of digital cameras, and more particularly relates to a method and system for processing a captured image.

BACKGROUND OF THE INVENTION

In digital cameras, images are represented by data and stored either in the camera's memory or an external memory device from which they can be accessed by a user. A significant advantage to digital cameras is that users then have the capability to manipulate the image data in a number of ways. Users are able to operate on and modify the images, transfer them to other devices, incorporate them into documents, display them in a variety of formats, and the like. Thus, in comparison to conventional cameras, digital cameras introduce a variety of capabilities and enhancements.

The digital camera incorporates a central processing unit, memory, and many other features of a computer system. Accordingly, the digital camera is capable of concurrently running multiple software routines and subsystems to control and coordinate the various processes of the camera. One subsystem of particular interest is the image processing subsystem that is used for analyzing and manipulating captured image data in a variety of ways, including linearization, defect correction, white balance, interpolation, color correction, image sharpening, and color space conversion. In addition, the subsystem typically coordinates the functioning and communication of the various image processing stages and handles the data flow between the various stages.

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images. Digital cameras can typically be coupled with a peripheral display, such as a television set or a computer display. In this manner, the user may view the various images stored within the digital camera on a larger display.

A problem exists however when a user attempts to view an image captured with the camera. Sometimes a camera user will rotate the camera, when capturing an image, in order to get a "full length" or "portrait" shot of the image being captured. This presents a problem when it comes time to view the image on the LCD screen of the camera because the user now has to rotate the camera in order to properly view the image. Additionally, if the image is exported to a peripheral display, such as a television set or a computer display, the user can't properly view the captured image, without rotating her head in an uncomfortable fashion or manually manipulating the image with image processing software.

Accordingly, what is needed is a method and system that allows a digital camera user to view captured images without having to rotate her head or manually manipulate the captured image. The method and system should be simple, cost effective and capable of being easily adapted to existing technology. The present invention addresses these needs.

SUMMARY OF THE INVENTION

The present invention includes a method/system for processing images captured with an image-capturing device. According to various embodiments of the present invention, a method/system includes reconfiguring a display of an image based on the orientation of the image-capturing device when the image is captured. Through the use of the method and system in accordance with the present invention, a user can view captured images without having to account for a rotation of the image-capturing device.

A first aspect of the present invention includes a method of processing an image. The method includes capturing the image with an image-capturing device, determining an orientation of the image-capturing device and reconfiguring a display of the image based on the orientation of the image-capturing device.

A second aspect of the present invention includes an image processing system. The image processing system includes an image-capturing device capable of determining an orientation thereof in relation to a reference axis and a system coupled to the image-capturing device wherein the system is capable of displaying the captured image based on the orientation of the image-capturing device when the image is captured.

Other aspects and advantages of the present invention will become apparent from the following detailed description, taken in conjunction with the accompanying drawings, illustrating by way of example the principles of the invention.

DETAILED DESCRIPTION

The present invention relates to a method and system for processing an image. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention includes a method and system for processing images captured with an image-capturing device. According to the present invention, a method and system includes reconfiguring a display of an image based on the orientation of the image-capturing device when the image is captured. Through the use of the method and system in accordance with the present invention, a user can view captured images without having to account for a rotation of the image-capturing device when the image is captured.

Figure 1:
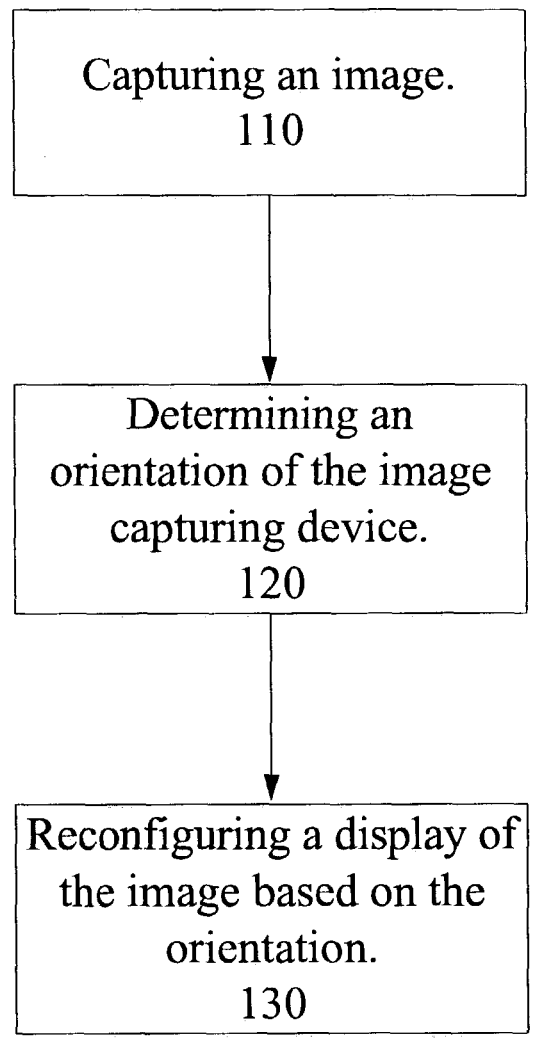
FIG. 1 is a high-level flow chart of a method in accordance with an embodiment of the present invention.

For a further understanding of the present invention, please refer now to FIG. 1. FIG. 1 is a flowchart of a method in accordance with an embodiment of the present invention. A first step 110 includes capturing an image. The next step 120 includes determining an orientation of the image-capturing device. A final step 130 includes reconfiguring a display of the image based on the orientation. This step can include reconfiguring the captured image on a display screen of the image-capturing device or reconfiguring the captured image on a peripheral display coupled to the image-capturing device.

Figure 2:
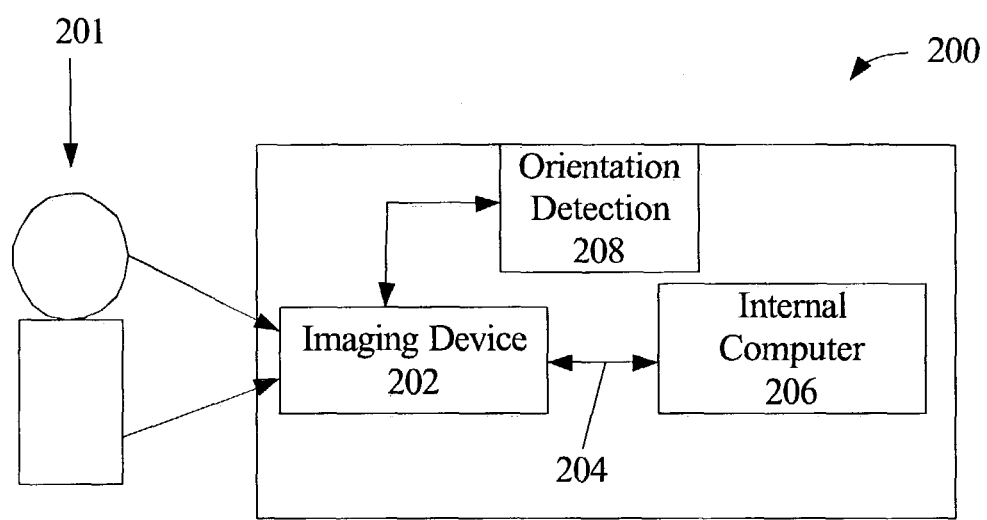
FIG. 2 is a block diagram of an image-capturing device according to an embodiment of the present invention.

In an embodiment, step 110 is accomplished utilizing an image-capturing device such as a digital camera or the like. For an example of such a device, please refer to FIG. 2. FIG. 2 is a block diagram of an image-capturing device 200 in accordance with an embodiment of the present invention. Image-capturing device 200 can include an imaging device 202, a system bus 204, a computer 206 and an orientation detection mechanism 208. Imaging device 202 can be optically coupled to an object 201 and electrically coupled via system bus 204 to computer 206.

The orientation detection mechanism 208 can be coupled to the imaging device 202. Once a photographer has focused imaging device 202 on object 201 and, using a capture button or some other means, instructed image-capturing device 200 to capture an image of object 201, computer 206 can command the imaging device 202 via system bus 204 to capture raw image data representing object 201. The captured raw image data can be transferred over system bus 204 to computer 206 which performs various image processing functions on the image data before storing it in its internal memory. System bus 204 also passes various status and control signals between imaging device 202 and computer 206.

Although the above image-capturing device of the present invention is described in the context of being a digital camera, one of ordinary skill in the art will readily recognize that the image-capturing device can be a mobile phone, a personal-digital-assistant (PDA) or a variety of other devices, while remaining within the spirit and scope of the present invention.

Figure 3:
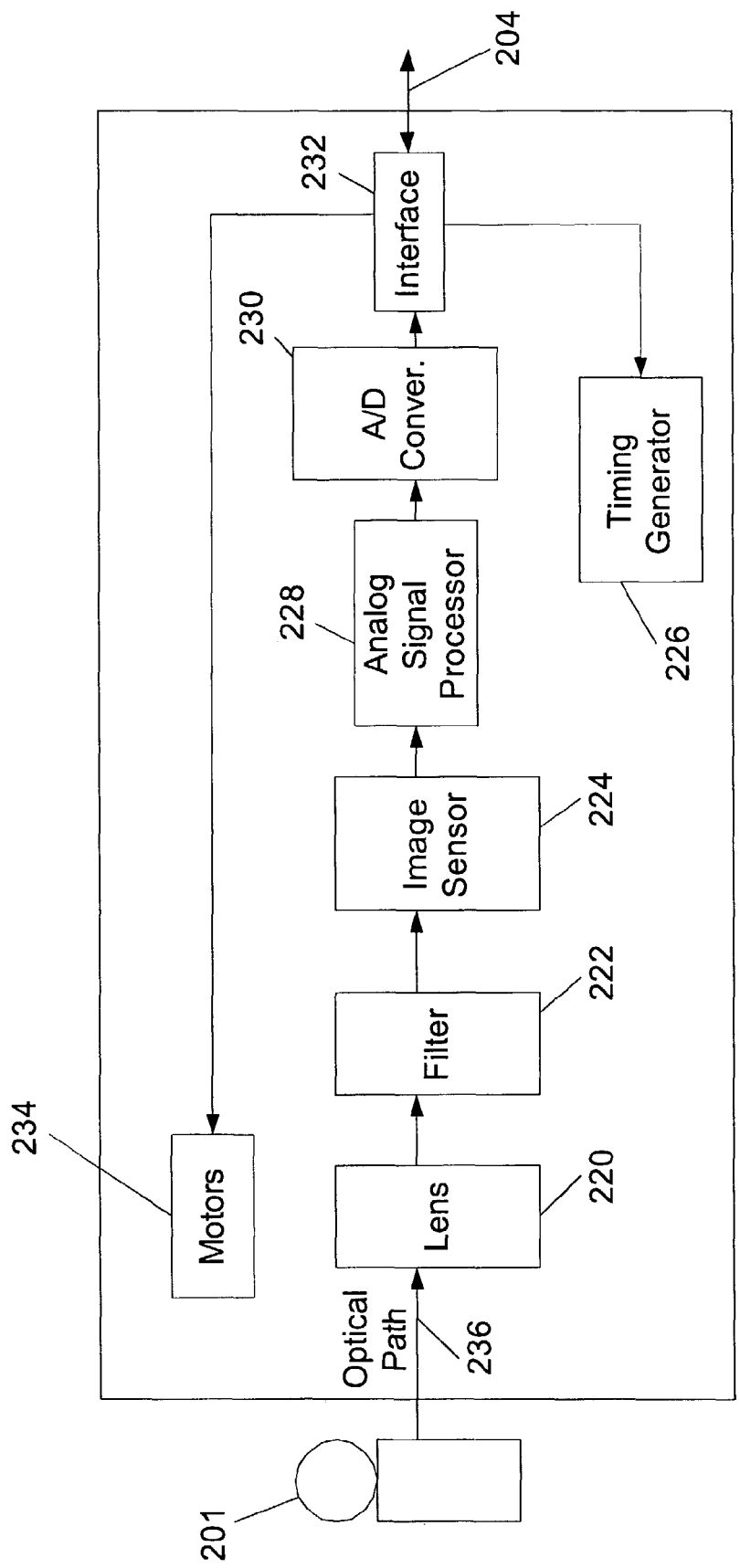
FIG. 3 is a more detailed block diagram of an imaging device according to an embodiment of the present invention.

Referring now to FIG. 3, a more detailed block diagram of an embodiment of the imaging device 202 is shown. Imaging device 202 can be a lens 220 having an iris, a filter 222, an image sensor 224, a timing generator 226, an analog signal processor (ASP) 228, an analog-to-digital (A/D) converter 230, an interface 232, and one or more motor 234.

In operation, imaging device 202 captures an image of object 201 via reflected light impacting image sensor 224 along optical path 236. Image sensor 224 responsively generates a set of raw image data representing the captured image. The raw image data can then be routed through ASP 228, A/D converter 230 and interface 232. Interface 232 has outputs for controlling ASP 228, motors 234 and timing generator 226. From interface 232, the raw image data passes over system bus 204 to the internal computer 206.

Figure 4:
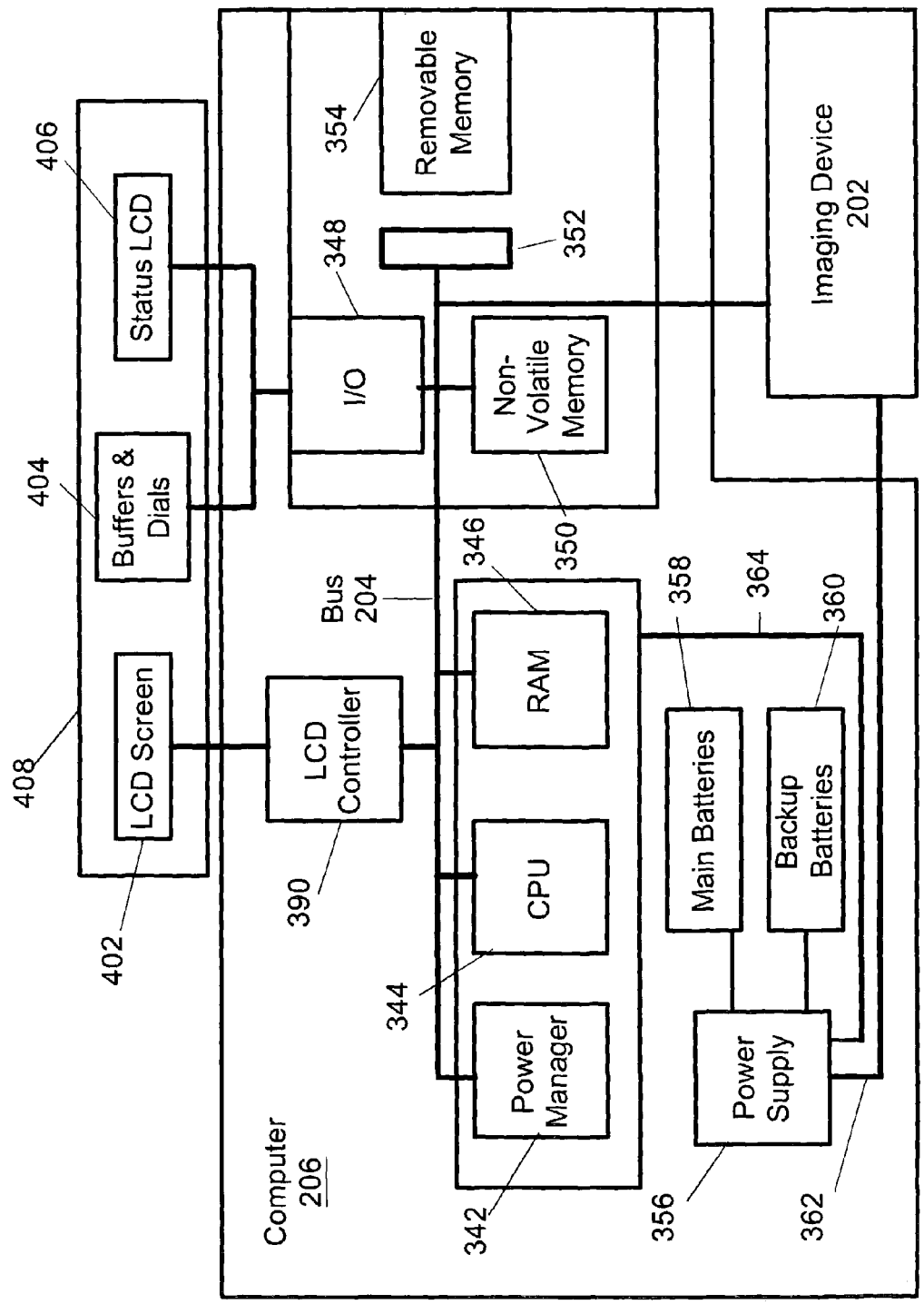
FIG. 4 a more detailed block diagram of an internal computer according to an embodiment of the present invention.

Referring now to FIG. 4, a more detailed block diagram of an embodiment of the internal computer 206 is shown. System bus 204 provides connection paths between imaging device 202, power manager 342, central processing unit (CPU) 344, random-access memory (DRAM, MRAM, FeRAM, etc.) 346, input/output interface (I/O) 348, read-only memory (ROM) 350, and buffers/connector 352. Removable memory 354 connects to system bus 204 via buffers/connector 352. Alternately, image-capturing device 200 may be implemented without removable memory 354 or buffers/connector 352.

Power manager 342 communicates via line 366 with power supply 356 and coordinates power management operations for image-capturing device 200. CPU 344 typically includes a conventional processor device for controlling the operation of image-capturing device 200. In an embodiment, CPU 344 can be capable of concurrently running multiple software routines to control the various processes of image-capturing device 200 within a multi-threading environment. RAM 346 can be a contiguous block of dynamic memory which may be selectively allocated to various storage functions.

I/O 348 can be an interface device allowing communications to and from computer 206. For example, I/O 348 permits an external host computer (not shown) to connect to and communicate with computer 206. I/O 348 also permits an image-capturing device 200 user to communicate with image-capturing device 200 via an external user interface and via an external display panel. This is referred to as a view finder.

ROM 350 can include a nonvolatile read-only memory which stores a set of computer-readable program instructions to control the operation of image-capturing device 200. Removable memory 354 serves as an additional image data storage area and is preferably a non-volatile device, readily removable and replaceable by a image-capturing device 200 user via buffers/connector 352. Thus, a user who possesses several removable memories 354 may replace a full removable memory 354 with an empty removable memory 354 to effectively expand the picture-taking capacity of image-capturing device 200. In an embodiment of the present invention, removable memory 354 is typically implemented using a flash disk.

Power supply 356 supplies operating power to the various components of image-capturing device 200. In an embodiment, power supply 356 provides operating power to a main power bus 362 and also to a secondary power bus 364. The main power bus 362 provides power to imaging device 202, I/O 348, ROM 350 and removable memory 354. The secondary power bus 364 provides power to power manager 342, CPU 344 and RAM 346.

Power supply 356 can be connected to main batteries 358 and also to backup batteries 360. In an embodiment, a user of the image-capturing device 200 may also connect power supply 356 to an external power source. During normal operation of power supply 356, the main batteries 358 provide operating power to power supply 356 which then provides the operating power to image-capturing device 200 via both main power bus 362 and secondary power bus 364.

During a power failure mode in which the main batteries 358 have failed, the backup batteries 360 provide operating power to power supply 356 which then provides the operating power only to the secondary power bus 364 of image-capturing device 200. Selected components of image-capturing device 200 (including RAM 346) are thus protected against a power failure in main batteries 358.

Power supply 356 can also include a flywheel capacitor connected to the power line coming from the main batteries 358. If the main batteries 358 suddenly fail, the flywheel capacitor temporarily maintains the voltage from the main batteries 358 at a sufficient level, so that computer 206 can protect any image data currently being processed by image-capturing device 200 before shutdown occurs.

Figure 5A:
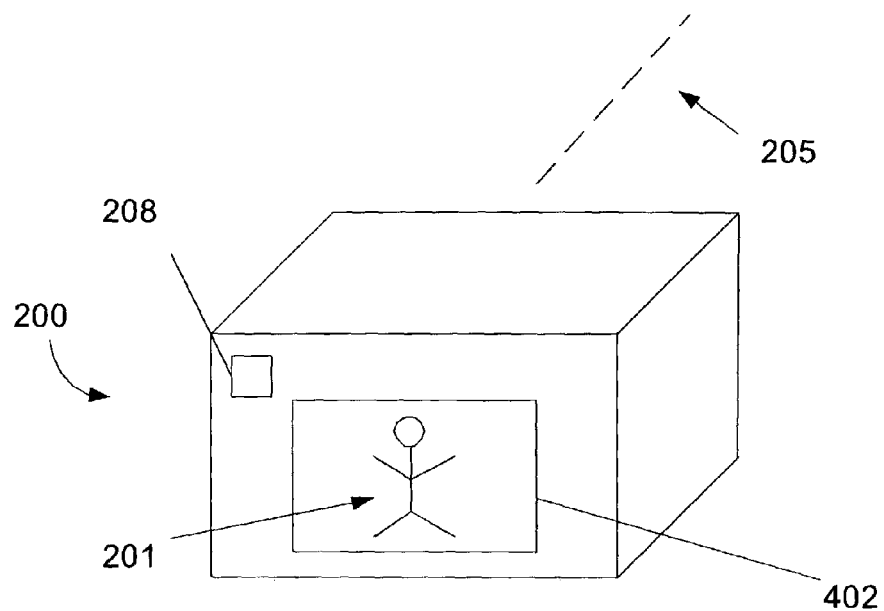
FIG. 5A shows an image-capturing device in a normal position to capture an image of object in accordance with an embodiment of the present invention.

Referring back to FIG. 1, in an embodiment, step 120 can be accomplished utilizing an orientation detection mechanism coupled within the image-capturing device 200. The orientation detection mechanism 208 is capable of determining the orientation of the image-capturing device 200 at the time the image-capturing device 200 captures an image of an object. For a better understanding, please refer to FIGS. 5A and 5B. FIG. 5A shows the image-capturing device 200, including the orientation detection mechanism 208, in a normal position to capture an image of an object 201. Also, shown on the image-capturing device 200 is an LCD screen 402. In the normal position, the orientation of the image-capturing device 200 is level with respect to a reference axis. In an embodiment, the reference axis is the horizontal plane 205.

When the orientation of the image-capturing device 200 is level (±5-10°), the image of the object 201 is captured by the image-capturing device 200 and stored as an image file in a regular fashion. However, if the orientation of the image-capturing device 200 is not level with respect to the reference axis 205, then the orientation detection mechanism 208, determines the orientation of the image-capturing device 200 with respect to the reference axis 205 and stores this information in the image file of the captured image. In an embodiment, the orientation of the image-capturing device 200 is stored in the image file header. A file header is the first part of the image file and contains controlling data as well as the structural layout of the contents of the image file.

Figure 5B:
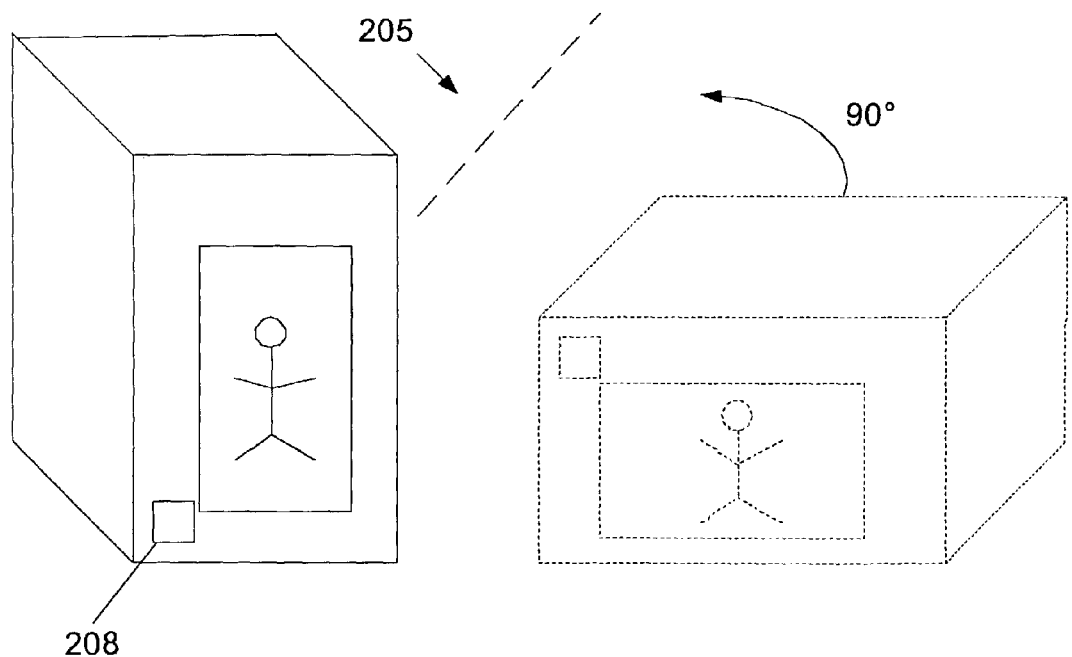
FIG. 5B shows the image-capturing device in a rotated orientation with respect to a reference axis in accordance with an embodiment of the present invention.

For a better understanding, please refer to FIG. 5B. FIG. 5B shows the image-capturing device 200 in a rotated orientation with respect to a reference axis 205. As can be seen in FIG. 5B, the image-capturing device 200 has been rotated approximately 90° to the left. Accordingly, the orientation detection mechanism 208, determines the orientation of the image-capturing device 200 with respect to the reference axis 205 and subsequently stores this orientation information in the associated image file. Once the orientation information is stored in the associated image file, the resulting display of the image can be reconfigured in order to account for the orientation of the image-capturing device 200 with respect to the reference axis 205.

The image file is accordingly processed with image processing software whereby the image is reconfigured based on the orientation of the image-capturing device 200 with respect to the reference axis and subsequently displayed as though the orientation of the image-capturing device 200 was level with respect to the reference axis. In an embodiment, the image is reconfigured utilizing "local" image processing software contained within the internal computer 206 of the image-capturing device 200. For example, if the orientation detection mechanism 208 determines that the orientation of the image-capturing device 200 is 90° from the reference axis 205, the orientation is stored within the image file and local image processing software will rotate (re-orient) the captured image whereby the captured image is displayed as though the image-capturing device 200 was level at the time the image was captured.

An embodiment of the orientation detection mechanism 208 includes an accelerometer. An accelerometer, as is well known to those skilled in the art, detects acceleration and provides a voltage output that is proportional to the detected acceleration. Most accelerometers measure acceleration based on the effect gravity has on the desired object. By detecting the direction of the gravitational acceleration, the accelerometer can be utilized to sense the orientation of the image-capturing device. The orientation information can then be stored in an associated image file.

Although the above-described embodiment of the present invention is described in the context of being implemented in conjunction with an accelerometer, one of ordinary skill in the art will readily recognize that a variety of devices can be utilized to determine the orientation of the image-capturing device 200 with respect to the reference axis while remaining within the spirit and scope of the present invention.

Additionally, in an embodiment of the present invention, the orientation detection capability of the image-capturing device 200 can be turned on or off by the user. Accordingly, the image-capturing device 200 can operate in "re-orientation" mode whereby the orientation detection mechanism 208 determines the orientation of the image-capturing device 200 with respect to a reference axis when an image is captured and the orientation information is stored in the image file. Alternatively, the user can disable the orientation detection capability of the image-capturing device 200 via a switch, button, on board menu or other means, thus operating the image-capturing device 200 in a "normal" mode whereby image files are created without including the orientation information.

Figure 6:
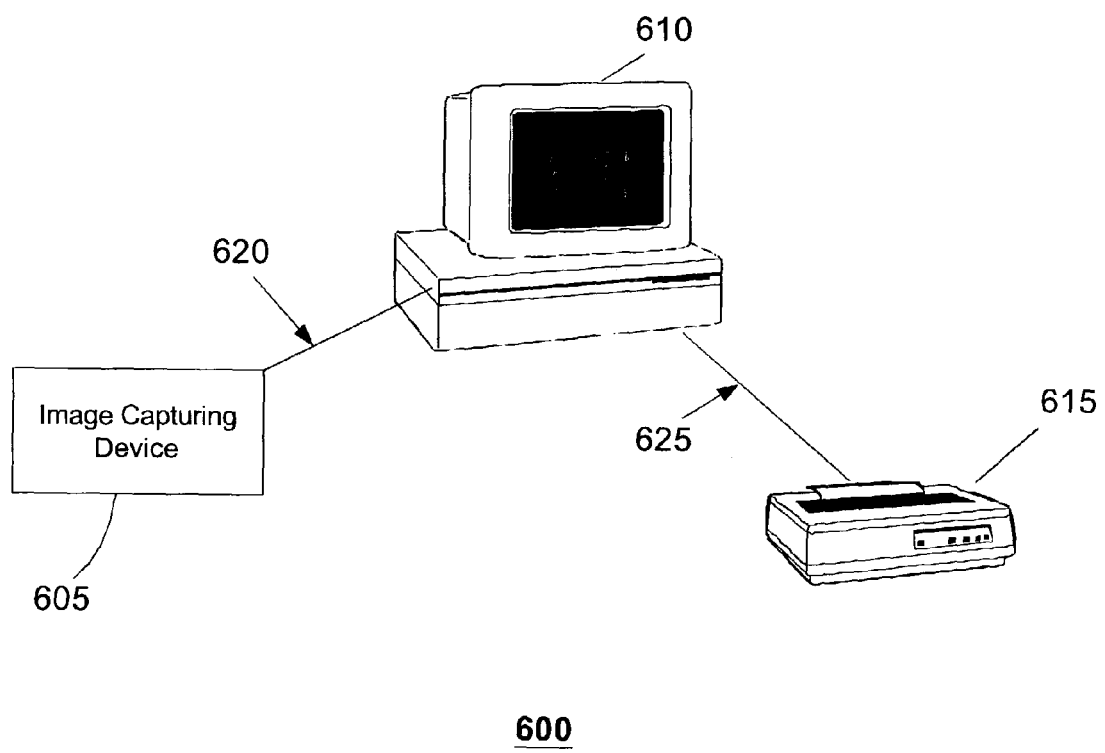
FIG. 6 shows an image processing system in accordance with an embodiment of the present invention.

An alternate embodiment of the present invention includes an image processing system. As shown in FIG. 6, the image processing system 600 includes an image-capturing device 605 (similar to image-capturing device 200), a personal computer system (PC) 610, and a printer 615. The image-capturing device 605 and PC 610 can be connected to each other via a communication cable 620 such as an RS232C cable and the PC 610 and printer 615 are connected to each other via a communication cable 625 such as a Centronics cable.

Figure 7:
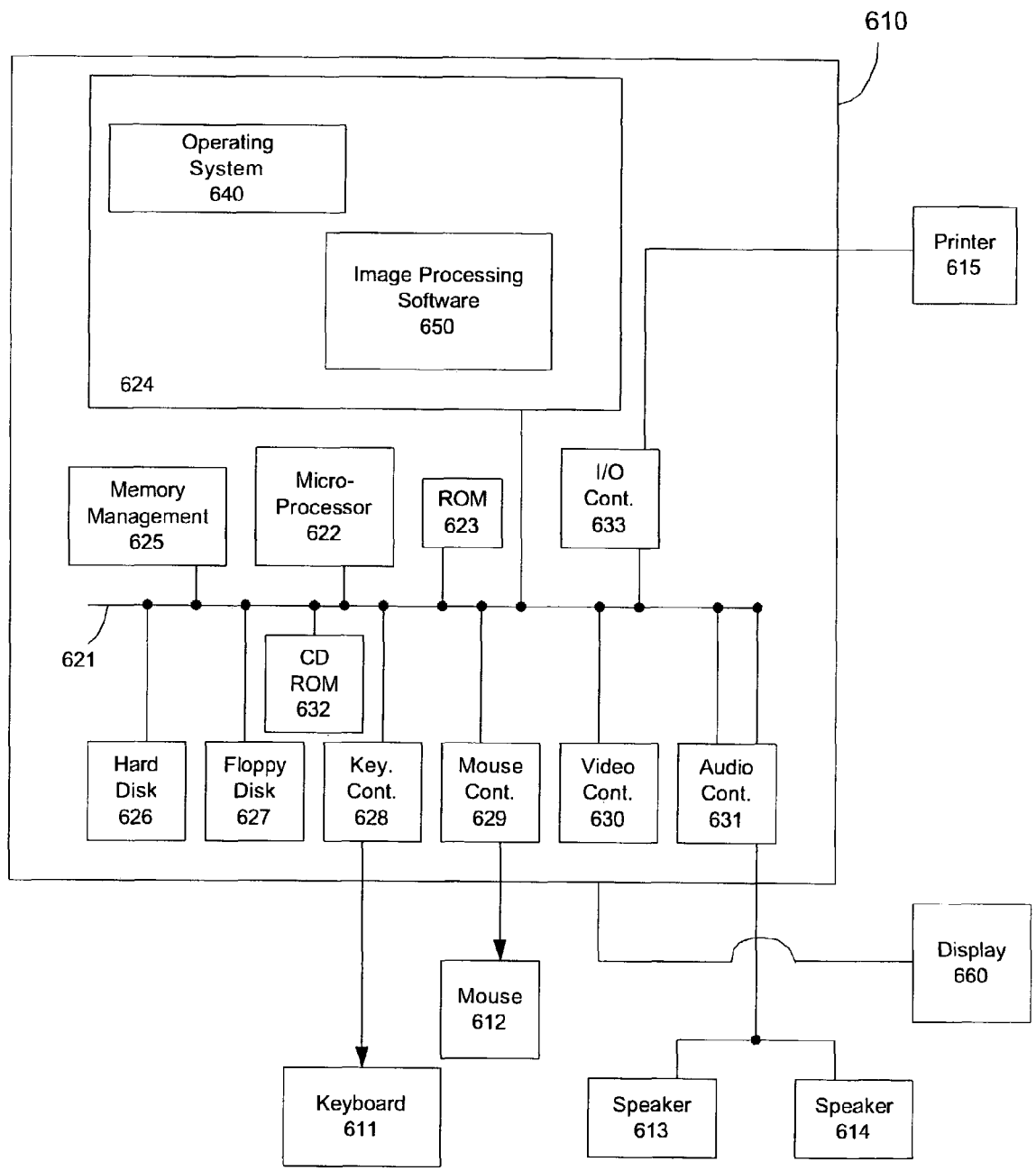
FIG. 7 an illustration of a PC that can be utilized in conjunction with the image processing system in accordance with an embodiment of the present invention.

Referring back to FIG. 6, the image processing system 600 can include a PC 610. For an example of such a PC, please refer now to FIG. 7. FIG. 7 is an illustration of a PC 610 that can be utilized in conjunction with the image processing system 600. The PC 610, including, a keyboard 611, a mouse 612 and a printer 615 are depicted in block diagram form. The PC 610 includes a system bus or plurality of system buses 621 to which various components are coupled and by which communication between the various components is accomplished. The microprocessor 622 is connected to the system bus 621 and is supported by read only memory (ROM) 623 and random access memory (RAM) 624 also connected to the system bus 621. A microprocessor is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 623 contains, among other code, the Basic Input-Output system (BIOS) which controls basic hardware operations such as the interaction of the processor and the disk drives and the keyboard. The RAM 624 is the main memory into which the operating system 640 and remote image processing software 650 are loaded. (Image processing software 650 is categorized as "remote" in that it is not contained within image-capturing device 605.) The memory management chip 625 is connected to the system bus 621 and controls direct memory access operations including, passing data between the RAM 624 and hard disk drive 626 and floppy disk drive 627. The CD ROM 632 also coupled to the system bus 621 is used to store a large amount of data, e.g., a multimedia program or presentation.

Various I/O controllers are also connected to this system bus 621. These I/O controllers can include a keyboard controller 628, a mouse controller 629, a video controller 630, and an audio controller 631. As might be expected, the keyboard controller 628 can provide the hardware interface for the keyboard 611, the mouse controller 629 can provide the hardware interface for mouse 612, the video controller 630 can provide the hardware interface for the display 660, and the audio controller 631 can provide the hardware interface for the speakers 613, 614. Another I/O controller 633 can enable communication with the printer 615.

One of ordinary skill in the art will readily recognize that the PC 610 can include a personal-digital-assistant (PDA), a laptop computer or a variety of other devices while remaining within the spirit and scope of the present invention.

The PC 610 may also be utilized in conjunction with a distributed computing environment where tasks are performed by remote processing devices that are linked through a communications network The network may include LANnets, a WANnets, the Internet and/or an Intranet. Client terminals can include personal computers, stand-alone terminals, and organizational computers. The stand-alone terminal may include hardware for loading smart cards, reading magnetic cards, and processing videographics. The servers can include information servers, transactional servers and/or an external server. A transactional server may perform financial and/or personal transactions. The network can include a graphical user interface for displaying a portion of the characteristic data on client terminals. The system may be operable with a plurality of third party applications. Additionally, the networks can communicate via wireless means or any of a variety of communication means while remaining within the spirit and scope of the present invention.

Referring back to FIG. 6, an image captured by the image-capturing device 605 can be temporarily stored as image data in an image file within the image-capturing device 605. Accordingly, the orientation information can be stored in the image file as well. When the sensed image is to be displayed by the PC 610, image-capturing device 605 and PC 610 are connected using the communication cable 620, and image processing software installed on the PC 610 is started. Communications between the PC 610 and the image-capturing device 605 are done via communication software, and the image data stored in the image file is transmitted from the flash memory of the image-capturing device 605 to the PC 610 via the communication cable 620.

The transmitted image data can then be temporarily stored in the hard disk 626 (see FIG. 7) of the PC 610. The image can then be transmitted from the hard disk 626 to the display 660 (see FIG. 7) for viewing by the user. However, the remote image processing software 650 within the PC 610 reconfigures the image based on the orientation information contained in the image file. In an embodiment, the remote image processing software 650 can retrieve the orientation information from the header of the transmitted image file. Alternatively, if the image was reconfigured utilizing local image processing software (i.e. image processing software contained within the image-capturing device 605), the remote image processing software 650 simply displays the already reconfigured image without further manipulation. Accordingly, the user views the reconfigured image without having to account for a rotation of the image-capturing device 605 at the time the image was captured.

In an embodiment, when the image data transmitted from the image-capturing device 605 is stored in the PC 605, the PC 605 starts a printer driver for the printer 615, the image data captured from the image-capturing device 605 is converted into print data that can be printed by the printer 615 via the printer driver, and the converted print data is output to the printer 615 via the communication cable 625. The printer 615 receives the print data via the communication cable 625, and prints an image converted into the print data onto a print paper sheet. In accordance with the present invention, the printer driver reconfigures the image based on the orientation information contained in the image file and prints the reconfigured display of the image.

Although the above-described embodiment includes cable connections, one of ordinary skill in the art will readily recognize that a variety of connections can be utilized. For example, a wireless connection, such as a Bluetooth radio link can be employed. Bluetooth is an open standard for short-range transmission of digital voice and data between mobile devices (laptops, PDAs, phones) and desktop devices. It supports point-to-point and multipoint applications. Unlike Infra-Red, which requires that devices be aimed at each other (line of sight), Bluetooth uses omni-directional radio waves that can transmit through walls and other non-metal barriers. Bluetooth transmits in the unlicensed 2.4 GHz band and uses a frequency hopping spread spectrum technique that changes its signal 1600 times per second. If there is interference from other devices, the transmission does not stop, but its speed is downgraded.

Additionally, in an embodiment of the present invention, the image processing software can be configured to operate in a "re-orientation" mode whereby the image processing software actively searches the image file to find the orientation information of the image in order to determine the orientation of the image-capturing device 605 with respect to a reference axis when the image is captured. Alternatively, the user can disable this feature, thus allowing the image processing software to operate in a "normal" mode whereby image files can be displayed without reconfiguring the image in order to account for a rotation of the image-capturing device when the image was captured.

Figure 8:
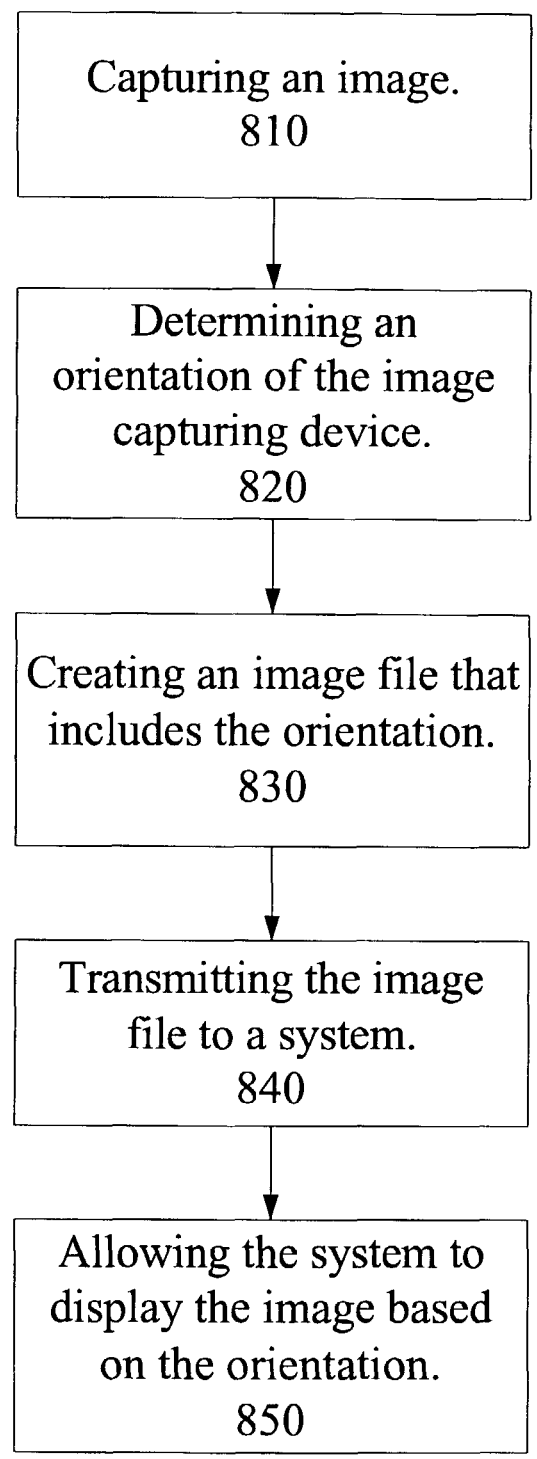
FIG. 8 is a flowchart of a method in accordance with an alternate embodiment of the present invention.

For a better understanding, please refer to FIG. 8. FIG. 8 is a flowchart of a method in accordance with an alternate embodiment of the present invention. First, an image is captured with an image-capturing device, via step 810. Next, the orientation of the image-capturing device is determined, via step 820. This can be accomplished with an orientation detection mechanism within the image-capturing device. An image file is then created that includes the orientation of the image-capturing device, via step 830. The image file is then transmitted to a system, via step 840. In an embodiment, the system is a personal computer. Finally, the system displays the image based on the orientation of the image-capturing device, via step 850. In an embodiment, image processing software within the personal computer reconfigures the display of the image based on the orientation of the image-capturing device.

The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

A method and system for processing an image has been disclosed. According to the present invention, a method and system is provided for reconfiguring a display of an image based on the orientation of the image-capturing device when the image is captured. Through the use of the method and system in accordance with the present invention, a user can view captured images without having to account for a rotation of the image-capturing device at the time the image is captured.

Although the present invention has been described in accordance with the embodiments shown, one of ordinary skill in the art will readily recognize that there can be variations to the embodiments and those variations would be within the spirit and scope of the present invention. Accordingly, many modifications may be made by one of ordinary skill in the art without departing from the spirit and scope of the appended claims.

What is claimed is:

1. A method of processing an image comprising:
    capturing the image with an image-capturing device wherein the image is included in an image file;
    determining an orientation of the image-capturing device;
    encoding the orientation of the image-capturing device into the image file; and
    reconfiguring a display of the image based on the orientation of.

2. The method of claim 1 wherein the image-capturing device includes an orientation detection mechanism and determining the orientation of the image-capturing device further comprises:
    utilizing the orientation detection mechanism to determine the orientation of the image-capturing device.

3. The method of claim 2 wherein the image-capturing device includes image processing software and reconfiguring a display of the image further includes:
    utilizing the image processing software to reconfigure the display of the image.

4. The method of claim 2 wherein the orientation detection mechanism comprises an accelerometer.

5. The method of claim 2 wherein the image-capturing device comprises a digital camera.

6. The method of claim 2 wherein the image-capturing device comprises a mobile phone.

7. The method of claim 2 wherein the image-capturing device comprises a personal digital assistant.

8. The method of claim 1 wherein reconfiguring a display of the image further comprises:
    coupling the image-capturing device to a system; and
    allowing the system to reconfigure the display of the image based on the orientation of the image-capturing device when the image is captured.

9. The method of claim 1 wherein the image-capturing device is capable of operating in are orientation mode.

10. A computer program product for processing an image, the computer program product comprising a non-transitory computer usable medium having computer program means for causing a computer to perform the steps of:
    capturing the image with an image-capturing device wherein the image is included in an image file;
    determining en orientation of the image-capturing device;
    encoding the orientation of the image-capturing device into the image file; and
    reconfiguring a display of the image based on the orientation capturing device.

11. The computer program product of claim 10 wherein the image-capturing device includes an orientation detection mechanism and determining the orientation of the image-capturing device image further comprises:
    utilizing the orientation detection mechanism to determine the orientation of the image capturing device.

12. The computer program product of claim 11 wherein the image-capturing device includes image processing software and reconfiguring a display of the image further includes:
    utilizing the image processing software to reconfigure the display of the image.

13. The computer program product of claim 11 wherein the orientation detection mechanism comprises an accelerometer.

14. The computer program product of claim 11 wherein the image-capturing device comprises a digital camera.

15. The computer program product of claim 11 wherein the image-capturing device comprises a mobile phone.

16. The computer program product of claim 11 wherein the image-capturing device comprises a personal digital assistant.

17. The computer program product of claim 10 wherein reconfiguring a display of the image further comprises:
    coupling the image-capturing device to a system; and
    allowing the system to reconfigure the display of the image based on the orientation of the image-capturing device when the image is captured.

* * * * *

UNITED STATES PATENT AND TRADEMARK OFFICE
CERTIFICATE OF CORRECTION

PATENT NO. : 8,508,643 B2  
APPLICATION NO. : 10/346462  
DATED : August 13, 2013  
INVENTOR(S) : Janice H. Nickel et al.

Page 1 of 1

It is certified that error appears in the above-identified patent and that said Letters Patent is hereby corrected as shown below:

In the Claims

In column 9, lines 39-40, in Claim 1, delete "orientation of." and insert -- orientation. --, therefor.

In column 10, line 14, in Claim 9, delete "are orientation" and insert -- a re-orientation --, therefor.

In column 10, line 21, in Claim 10, delete "en" and insert -- an --, therefor.

In column 10, line 37, in Claim 13, delete "claim 11" and insert -- claim 12 --, therefor.

In column 10, line 40, in Claim 14, delete "claim 11" and insert -- claim 12 --, therefor.

In column 10, line 42, in Claim 15, delete "claim 11" and insert -- claim 12 --, therefor.

In column 10, line 44, in Claim 16, delete "claim 11" and insert -- claim 12 --, therefor.

Signed and Sealed this  
Eighteenth Day of February, 2014

Michelle K. Lee  
*Deputy Director of the United States Patent and Trademark Office*